United States Patent
Bieser et al.

(10) Patent No.: US 12,473,674 B2
(45) Date of Patent: Nov. 18, 2025

(54) BITUMINOUS MEMBRANES WITH BIODEGRADABLE BINDER

(71) Applicant: Freudenberg Performance Materials GmbH & Co. KG, Weinheim (DE)

(72) Inventors: Arno Bieser, Weinheim (DE); Katharina Ellmer, Monza (IT); Sandra Villing-Falusi, Mannheim (DE); Antonio La Porta, Mannheim (DE); Luca Assumma, Seregno (IT)

(73) Assignee: CARL FREUDENBERG KG, Weinheim (DE)

( * ) Notice: Subject to any disclaimer, the term of this patent is extended or adjusted under 35 U.S.C. 154(b) by 187 days.

(21) Appl. No.: 18/252,538

(22) PCT Filed: Nov. 9, 2021

(86) PCT No.: PCT/EP2021/081032
§ 371 (c)(1),
(2) Date: May 11, 2023

(87) PCT Pub. No.: WO2022/101163
PCT Pub. Date: May 19, 2022

(65) Prior Publication Data
US 2024/0018706 A1   Jan. 18, 2024

(30) Foreign Application Priority Data

Nov. 12, 2020   (EP) ..................................... 20207194

(51) Int. Cl.
| | | |
|---|---|---|
| *D04H 1/587* | (2012.01) | |
| *C09D 7/63* | (2018.01) | |
| *C09D 199/00* | (2006.01) | |
| *D04H 1/4218* | (2012.01) | |
| *D04H 1/435* | (2012.01) | |
| *D04H 1/4382* | (2012.01) | |
| *D04H 1/56* | (2006.01) | |
| *D04H 1/645* | (2012.01) | |
| *D04H 1/74* | (2006.01) | |
| *D06M 13/07* | (2006.01) | |
| *D06M 101/32* | (2006.01) | |

(52) U.S. Cl.
CPC ............... *D04H 1/587* (2013.01); *C09D 7/63* (2018.01); *C09D 199/00* (2013.01); *D04H 1/4218* (2013.01); *D04H 1/435* (2013.01); *D04H 1/43835* (2020.05); *D04H 1/56* (2013.01); *D04H 1/645* (2013.01); *D04H 1/74* (2013.01); *D06M 13/07* (2013.01); *D06M 2101/32* (2013.01); *D06M 2200/10* (2013.01); *D10B 2401/063* (2013.01); *D10B 2505/00* (2013.01)

(58) Field of Classification Search
CPC .. D04H 1/587; D04H 1/43835; D04H 1/4218; D04H 1/435; D04H 1/56; D04H 1/645; D04H 1/74; C09D 7/63; C09D 199/00; D06M 13/07; D06M 2101/32; D06M 2200/10; D10B 2401/063; D10B 2505/00
See application file for complete search history.

(56) References Cited

U.S. PATENT DOCUMENTS

| | | | |
|---|---|---|---|
| 2011/0003522 A1 | 1/2011 | Chen et al. | |
| 2019/0135688 A1 | 5/2019 | Hjelmgaard | |
| 2020/0047478 A1* | 2/2020 | Hjelmgaard | ............. C09J 11/06 |

FOREIGN PATENT DOCUMENTS

| | | |
|---|---|---|
| EP | 2730631 A1 | 5/2014 |
| EP | 3299514 A1 | 3/2018 |
| FR | 3032195 A1 | 8/2016 |
| JP | S5164545 A1 | 6/1976 |
| WO | WO 2013/057086 A1 | 4/2013 |
| WO | WO 2017/194717 A1 | 11/2017 |

* cited by examiner

*Primary Examiner* — Jeremy R Pierce
(74) *Attorney, Agent, or Firm* — LEYDIG, VOIT & MAYER, LTD.

(57) ABSTRACT

Subject of the invention is a nonwoven, wherein the nonwoven fibers are organic polymer fibers, and wherein the nonwoven is consolidated with an aqueous binder, wherein the binder comprises protein and a polyphenolic compound from natural origin. Preferably, the nonwoven carrier is highly suitable for producing bituminous membranes. Subject of the invention are also uses, methods, bituminous membranes, binders and building materials, which are related to the nonwoven carrier.

20 Claims, No Drawings

BITUMINOUS MEMBRANES WITH BIODEGRADABLE BINDER

CROSS REFERENCE TO PRIOR APPLICATIONS

This application is a U.S. National Phase application under 35 U.S.C. § 371 of International Application No. PCT/EP2021/081032, filed on Nov. 9, 2021, and claims benefit to European Patent Application No. 20207194.0, filed on Nov. 12, 2020. The International Application was published in English on May 19, 2022 as WO 2022/101163 A1 under PCT Article 21(2).

FIELD

The invention relates to a nonwoven from organic polymer fibers, which is consolidated with an aqueous binder, wherein the binder comprises protein and a polyphenolic compound from natural origin.

BACKGROUND

Bituminous membranes having waterproofing and shielding properties are used in building applications, especially as roofing materials. Standard nonwoven carriers for bituminous membranes for building applications are flexible sheets, which have a thickness of only a few millimeters and can be rolled up and unrolled conveniently. The bituminous membranes consist of a textile carrier, which is impregnated with bitumen. The main function of the textile carrier is to confer mechanical resistance and dimensional stability to the bituminous membrane and to "keep the bitumen together". The bitumen is applied to the textile carrier in a molten bitumen bath at about 180° C. to 200° C., followed by cooling and solidification. The textile fabric can be a nonwoven, which has been consolidated with aqueous binder. The binder shall increase the mechanical resistance and dimensional stability of the nonwoven carrier. The binder can be applied to the nonwoven by impregnation with aqueous binder solution, drying and solidification. Typically, the amount of solid binder on the nonwoven is relatively low, such that it remains porous and can be thoroughly impregnated with the bitumen.

Such binder consolidated nonwoven carriers for bituminous membranes preferably have specific properties, which render them suitable for producing bituminous membranes.

On the one hand, the nonwoven carrier should have high dimensional stability at hot temperature. The high dimensional stability is important when the nonwoven carrier is torn through the molten bitumen bath at about 180° C. under mechanical stress and strain in an industrial production process. Ideally, the nonwoven carrier should not develop dimensional shrinking or stretching when subjected to high temperature and/or to mechanical force. It should easily follow all stresses in the bituminization process showing a high initial modulus and a high dimensional stability at high temperature (180-200° C.). Without dimensional stability at hot temperature, the nonwoven carrier would change or lose its shape during the production process. Such a carrier would either not be suitable for industrial processing at all, or the bituminous membrane product could develop an irregular structure, which could impair the waterproofing and shielding function.

On the other hand, the nonwoven carrier should have a high mechanical resistance at low temperature. Mechanical performance of the nonwoven carrier at room temperature is relevant for the final properties of the bituminous membrane in a building or roofing application. For such applications, the bituminous membrane should have a high tensile strength, high tenacity or high elongation at break, depending on the specific requirements of the technical application. Mechanical resistance of nonwoven carriers reduces damages of the bituminous membranes under stress at a construction site and can preserve long term integrity and function.

Bituminous membranes are required for building applications in large amounts. Typically, they are produced in automated production lines, wherein a roll of nonwoven carrier is continuously unwound and torn through a bath of molten bitumen at about 180° C. Subsequently, the product is cooled until the bitumen solidifies and the bituminous membrane can be rolled up. It is important that the nonwoven carrier is not stretched or deformed in the impregnation process. The binder has the purpose to increase dimensional stability of the nonwoven carrier. However, it is a problem that the efficacy of conventional binders tends to deteriorate significantly at such a high temperature. Therefore, conventional binder-consolidated nonwovens are generally not suitable for consolidating nonwoven carriers for bituminous membranes, even if they may be useful at low temperature.

The bituminous membranes must meet high quality standards for various building applications. Typical applications are roofing sarking, shielding or waterproofing membranes. Bituminous membranes must shield a building or roof from moisture for long time periods, typically in the range of decades. Therefore, it is very important that bituminous membranes are highly homogenous. Even small defects, such as cracks, punctures or structural irregularities, can induce leakage of moisture or other severe problems at a building site over extended time periods. Therefore, the nonwoven carriers embedded in bituminous roofing membranes should have high mechanical resistance at normal temperature, such that they can be processed at the construction site without damages and withstand stress and strain over long time periods, as required by technical specifications of the user.

In conclusion, it is desirable that such nonwoven carriers for bituminous membranes are thin and flexible, but at the same time have high mechanical resistance at room temperature and high dimensional stability at hot temperature.

Conventional binders for consolidating nonwoven carriers for bituminous membranes are predominantly based on synthetic polymers, such as styrene butadiene rubber (SBR), polyurethane, styrene acrylic or acrylic polymers. Since bituminous membranes are required for worldwide building applications, high amounts of binder are used. For environmental reasons, it would be desirable to consolidate the nonwoven carriers with a binder, which is sustainable and environmentally friendly. Especially binders from natural materials would reduce waste problems and improve the carbon dioxide balance. A binder from natural raw materials could be stripped from the carrier after use and composted, whilst the nonwoven fibers could be recycled. Besides, also the waste from the binder bath for nonwoven impregnation would be compostable. Overall, a significant reduction of waste and environmental problems could be achieved if natural based binders would replace conventional synthetic polymer binders.

It is another problem of conventional binders for nonwoven carriers that they often comprise formaldehyde resin crosslinkers, such as urea or melamine formaldehyde. Since formaldehyde is toxic, it is not desirable in industrial applications for environmental and health reasons.

In order to provide more sustainable binders for nonwoven carriers for bituminous membranes, it has been suggested in the art to add starch into synthetic polymer binders. EP 3 299 514 A1 discloses a binder system based on polyvinyl alcohol and starch. However, since polyvinyl alcohol is a synthetic polymer, the binder is only partly sustainable. Besides, the document does not disclose specific binder compositions or working examples, such that product stability or potential advantages remain unclear.

US 20111003522A1 discloses a binder for fiber glass mats which comprises protein based biomass. US2019/0135688A1 discloses binders for mineral fibers comprising protein and phenolic compounds. However, glass fibers mats have various disadvantages. They are hard, not elastic and relatively heavy. Glass fibers and mats are also fragile and stiff and cannot be processed and handled conveniently. Moreover, properties which may be observed for glass fiber binders are often not obtained with organic polymer substrates. Since glass is an inorganic material with special physical and chemical properties, glass fibers do not interact the same way with adhesives as organic polymer fibers. Since glass is polar and wettable, it can generally be bonded efficiently with aqueous binders and their hydrophilic components. In contrast, plastic substrates have low polarity and thus low affinity for aqueous binders and their hydrophilic components, which can result in inadequate bonding. Moreover, deformation problems encountered with organic polymer nonwovens at hot temperature are not observed with glass fibers, which are dimensionally stable. Fine glass fibers are also known to cause health problems. Thus, it cannot be assumed that binders for glass fiber mats would be suitable for nonwovens from organic polymer fibers for use as substrates for bituminous membranes.

EP2730631A1 relates to binders for glass fiber mats, which comprise at least one carbohydrate, at least on nitrogen containing compound, and at least one soy protein. The nitrogen containing compounds are preferably low molecular weight diamines and the carbohydrates are preferably reducing sugars.

FR3032195A1 relates to a binder for mineral fibers, which comprises a lignosulfonate and a carbonyl compound.

WO2013/057086A1 relates to a binding resin for nonwoven fabrics, in particular for manufacturing supports for bituminous membranes. The binding resin consists of an aqueous starch-based solution, a crosslinking agent of natural origin and a catalyst.

SUMMARY

Provided is a nonwoven, wherein the nonwoven fibers are organic polymer fibers, wherein the nonwoven is consolidated with an aqueous binder, and wherein the binder comprises protein and a polyphenolic compound from natural origin. Also provided are methods for making and using the same, and for producing a bituminous membrane.

DETAILED DESCRIPTION

An embodiment of the invention is a nonwoven, wherein the nonwoven fibers are organic polymer fibers, wherein the nonwoven is consolidated with an aqueous binder, wherein the binder comprises protein and a polyphenolic compound from natural origin.

Embodiments of the inventive nonwoven, which is consolidated with the binder, is suitable as a nonwoven carrier. In this disclosure, the term "nonwoven carrier" refers to the binder consolidated nonwoven.

In a preferred embodiment, the nonwoven carrier is for producing bituminous membranes. Bituminous membranes are often used for building applications, especially roofing applications. In a typical production process, the nonwoven carrier is a substrate, which is impregnated with molten bitumen. After impregnation with bitumen and solidification, the bituminous membrane is obtained, which is a stable composite of the nonwoven, binder and bitumen. The bituminous membrane is watertight and can be used as a barrier material.

In certain embodiments, the nonwoven carrier comprises a nonwoven which is consolidated (bonded) with the binder. The nonwoven is a nonwoven fabric as defined in ISO 9092. Accordingly, the nonwoven is a sheet of fibers or continuous filaments that has been formed into a web by any means and bonded together by any means with the exception of weaving or knitting. Preferably, the fibers which form the nonwoven are randomly orientated. Typically, they have been bonded by friction, cohesion and/or adhesion.

In certain embodiments, the nonwoven carrier is consolidated with the aqueous binder. The binder is a dispersion or solution of the components in water. It is typically applied to the nonwoven substrate by impregnation in a bath, followed by drying and solidification. The consolidated binder bonds the fibers together, thereby enhancing the mechanical resistance and dimensional stability of the nonwoven.

The nonwoven carrier, which has been consolidated with the binder, is still porous. Accordingly, the binder does not completely fill the pores of the nonwoven substrate. Preferably, the pores are open and thus connected to each other. Preferably, liquid, such as the molten bitumen, can permeate the pores from one side of the nonwoven carrier to the other.

Preferably, the void fraction of the nonwoven carrier with binder and/or of the nonwoven substrate without the binder is between 60% and 95%, more preferably between 75% and 93%, especially between 80% and 90%. The porosity can be calculated from the weight and densities of the product and components. Preferably, the average pore diameter is between 50 μm and 300 μm, preferably between 80 μm and 200 μm, as preferably determined by ISO 15901-1:2016.

In certain embodiments, the nonwoven carrier is a sheet material. Preferably, the nonwoven carrier has a low stiffness and high flexibility. Accordingly, it is preferably rollable. Accordingly, it is preferably not rigid and not a board. An embodiment of the invention is also a roll of the nonwoven carrier and/or of the bituminous membrane. Such a roll can be unrolled and rolled up again by a user during use and processing. The flexibility of the nonwoven carrier is also advantageous in a continuous and/or automated production process and for convenient handling and application of the membrane at a construction site. Typically, the flexible bituminous membrane can be bent over edges or adapted to irregular surfaces. Preferably, the nonwoven carrier has a low stiffness. Thus, the flexibility is high, such that the nonwoven carrier can be bent and rolled.

According to certain embodiments of the invention, a nonwoven carrier can be consolidated with a sustainable binder, which is at least in part biodegradable and compostable. The main structural components of the binder, which are the protein, polyphenolic compound and optionally additional starch, can be provided from natural origin, preferably plant origin. These natural polymers form the binder matrix upon consolidation. Without being bound to theory, it is assumed that covalent bonds are formed between the polyphenolic compound and the protein and/or starch during consolidation. Preferably, the overall binder is based on materials from natural origin. In this regard, "from natural origin" means that the compound was obtained directly from natural origin or that the raw material from which it is manufactured is from natural origin. A material is also considered "from natural origin", if it was physically or chemically modified after isolation from the natural origin, whilst preserving the basic structure. Thus, the compound or material can be a derivative of the corresponding material from a natural source. Materials from natural origin for industrial applications, such as starch, protein or polyphenolic compounds, are often treated physically or chemically in order to adjust and improve properties such as solubility, viscosity, homogeneity or purity.

In contrast, a material from natural origin is not from fossil raw material, such as oil, coal and gas. Compounds from natural origin can be identified by isotope analysis, such as carbon-13 analysis. Preferably, the binder does not comprise a polymer which is produced synthetically, by in vitro polymerization, from monomers of natural origin. It is advantageous that the binder polymers can be obtained directly from natural origin and must not be polymerized from monomers from natural origin. For example, polyvinyl alcohol is not available from natural origin, but can be produced synthetically from bioethanol.

In certain embodiments, the binder comprises protein. Preferably, the amount of protein is at least 5 wt. %, preferably at least 10 wt. % of all solid binder components. Preferably, the amount of protein is up to 80 wt. %, more preferably up to 70 wt. %. Preferably, the amount is in the range of 5 to 80 wt. %, more preferably 10 to 70 wt. %. It is advantageous to include at least 5 wt. % protein, such that sufficient protein is available in the binder matrix. The amount may not exceed 80 wt. %, such that relevant amounts of the other components can also be included. As in this disclosure, all percentages of binder components are in weight percent of total solids in the aqueous binder. Preferably, the percentages also apply to the consolidated binder on the nonwoven carrier. Since such a binder typically adheres uniformly to the nonwoven, the ratio of components in the aqueous binder and consolidated binder can be approximately the same. However, some soluble low molecular weight components, such as minerals or catalysts, can remain in the aqueous binder solution.

In a specific embodiment, the amount of protein in the binder is higher than the amount of polyphenolic compounds and/or starch (in wt. % solids). Thus, the protein can be the main component in the binder (in wt. % of all solids). It was found that binder compositions with a high ratio of protein can confer high mechanical resistance and dimensional stability to the nonwoven.

In certain embodiments, the protein is from natural origin. The origin can be plant or animal, whilst plant is highly preferred. It was found that excellent mechanical properties of the nonwoven can be achieved with protein from plants. Plant protein is easily available in large amounts, can be handled conveniently and is also preferred for ethical reasons. Particularly suitable are proteins which are at least partially soluble in water and do not increase the viscosity significantly when dissolved in water.

Preferably, the plant is selected from fruits, pulses, legumes, nuts or seeds. Especially preferred sources are soy and wheat. It is especially preferred that the protein is soy protein. Preferably, the protein is provided into the binder as a flour, protein concentrate or protein isolate. The binder may comprise a soy protein isolate (SPI), soy protein concentrate or soy flour (SF). These basic soy protein products are typically derived from defatted flakes. The protein content in defatted flours and grits is about 52-54%, in concentrates about 62-69%, and in isolates about 86-87%.

According to embodiments of the invention, it is preferred that the protein is provided as a plant product, which comprises a relatively high amount of protein. Preferably, the protein is provided as a flour, especially soy flour. Surprisingly, it was found that a binder with excellent properties can be provided when adding the protein in the form of soy flour. Soy flour is available in high amounts and comprises a relatively high amount of protein. Typically, soy flour is produced by mechanically removing the hull from soy beans, extraction of oil with hexane and removal of residual hexane. The dried product is grinded to a desired particle size. Typically, soy flours may comprise about 45 to 60 wt. % protein, about 35 to 40 wt. % carbohydrates, 7 to 10 wt. % water, about 5 wt. % minerals and less than 1 wt. % fat. The carbohydrates comprise about 10 wt. % free sugars and 20 to 30 wt. % of various non-soluble sugars. The protein dispersibility index (PDI) is a standard analytic measure of the extent of heat treatment received by the flour. Soy protein with high PDI is usually better soluble and thus better suited. Thus, a dispersibility index of 90 is usually better than an index of 70 and 70 is better than 20.

In another embodiment, the protein is from animal origin. Examples of proteins from animal are gelatine, casein, whey, collagen, or protein from meat, eggs or fish. Among gelatines, particularly the hydrolysed ones are suitable, which can be produced by enzymatic hydrolysis of animal tissues. According to embodiments of the invention, it was found that a binder comprising animal protein can confer advantageous properties to the nonwoven carrier. However, plant proteins are preferred, because they may provide an even higher dimensional stability. Further, animal proteins are often more expensive and less convenient to use compared to plant protein products.

In another embodiment, a mixture of proteins from different origin is used, such as proteins from plant and animal. For example, it can be advantageous to include soy flour and gelatine into the binder.

In certain embodiments, the binder comprises a polyphenolic compound from natural origin. Preferably, the polyphenolic compound is a polymer of crosslinked phenolic groups. Preferably, the polyphenolic comprises or consists of the crosslinked phenolic groups. The polyphenolic compound comprises functional groups, typically hydroxyl groups, which can react with the protein and/or the starch molecules, such that a covalent polymer matrix can be formed. Preferably, the polyphenolic compound is covalently linked to the protein and/or starch during consolidation of the binder. Preferably, each molecule is covalently linked by at least two, preferably at least three sites to other binder molecules. The bonds can improve the mechanical properties of the binder and decrease water dissolution. The matrix may at least in part be formed by other means, such as hydrogen bonds.

Preferably, the amount of polyphenolic compound in the binder is at least 5 wt. %, preferably at least 10 wt. %, of all solid binder components. Preferably, the maximum amount of polyphenolic compound is up to 80 wt. %, more preferably up to 70 wt. % or up to 60 wt. %. Preferably, the amount of polyphenolic compound is 5 to 80 wt. %, more preferably 10 to 70 wt. % (total solids of binder). Preferably, the amount of polyphenolic compound in the binder is higher than the amount of protein and/or starch. According to embodiments of the invention, it was found that advantageous mechanical properties are obtainable, when a relatively high amount of the polyphenolic compound is included. This was unexpected, because in the art such polyphenolic compounds were occasionally added in relatively small amounts as crosslinkers. It is advantageous to use high amounts, because natural polyphenols, such as tannin or lignin, are available from natural source in large amounts and at relatively low costs. The polyphenolic compound is obtainable from natural sources. However, the polyphenolic compound from natural source can be physically or chemically modified.

Preferably, the polyphenolic compound is a tannin or a lignin. These naturally occurring polyphenolic compounds are characterized by multiple phenol rings, which comprise functional groups attached thereto. The phenol rings can be covalently linked to other biomolecules, such as flavans or glucose. Preferably, the polyphenolic compound comprises at least 2, more preferably at least 3 phenol rings. The polyphenolic compound may be a polymer, which comprises up to 100, preferably up to 50 phenol rings. Preferably, the polyphenolic compound comprises at least two hydroxyl groups per molecule. This can be advantageous for efficient crosslinking of the binder system.

In a preferred embodiment, the polyphenolic compound is a tannin. Tannins are water-soluble phenolic compounds. They are the fourth most abundant class of biochemical compounds in terrestrial biomass after cellulose, hemicelluloses and lignin, and are found in the bark, wood, leaves, fruits, and roots of a wide variety of vascular plants. Tannins can be divided into four classes which are condensed, hydrolysable, complex and phlorotannins. Complex tannins have a molecular structure that can be considered a mixture of hydrolysable and condensed sub-units, including gallic, ellagic and catechin sub-units.

In a highly preferred embodiment, the tannin is a condensed tannin. Condensed tannin (proanthocyanidins, polyflavonoid tannins, catechol-type tannins, pyrocatecollic type tannins, non-hydrolysable tannins or flavolans) are polymers formed by condensation of flavanol units. Typically, they do not contain sugar residues and the phenolic hydroxyl groups are totally or partially esterified with gallic acid. Condensed tannins represent more than 90% of the worldwide production of commercial tannins. The condensed tannins can be procyanidins, propelargonidins, prodelphinidins, profisetinidins, proteracacinidins, proguibourtinidins or prorobinetidins. Preferably, the condensed tannins are selected from mimosa and wattle (from *Acacia mearnsii*), birch (from *Betula* spp.), larch (from *Larix*), Norway spruce (from *Picea abies*), Aleppo pine (from *Pinus halepensis*), willow (from *Salix* spp.) or quebracho (from *Schinopsis balansae, S. lorentzii*). According to embodiments of the invention, it was found that condensed tannins provide especially advantageous properties to the nonwoven substrates.

It was found that tannins can significantly improve the properties of the binder composition based on proteins and optionally starch. Without being bound to theory, it is assumed that tannins are capable of forming complexes with proteins in the binder. The reaction of the tannins with the reactive sites of proteins such as free amino groups, thiol groups, and tryptophan residues typically may occur after their oxidative conversion to reactive quinones in the binder composition. Furthermore, tannins may increase the onset of starch gelatinisation and decrease the shear viscosity, which could also improve the properties of the binder and nonwoven carrier.

In another embodiment, the tannin is a hydrolysable tannin or pholorotannin. Hydrolyzable tannins comprise a monosaccharide core, usually glucose, which is esterified with gallic acid, forming the gallotannins, or with hexahydrodiphenoic acid, the precursor of ellagic acid, and gallic acid, thereby forming ellagitannins. Hydrolysable tannins can be tannic acid, also known as gallotannin, which is comprised of mixtures from various plant based sources. Pholorotannins are a small group of tannins isolated mainly from brown seaweeds.

In another preferred embodiment, the polyphenolic compound is lignin. Lignin is the second most abundant natural polymer after cellulose. It is mainly found in the cell wall of woody tree species. The main source of lignin readily available for use on a larger scale comes from spent pulping liquors and chemical liberation of wood fibers from the pulp and paper industries. Lignin is a highly branched and amorphous biomacromolecule with variable composition dependent on the plant source. Lignin is unique as a plant cell wall biopolymer due to its heterogeneity, lack of defined primary structure and aromatic functionality. The phenol content of lignins differs considerably. In general, 10 to 30 percent of the units are phenolic.

As used herein, the term lignins relates to natural lignins or to lignins which are modified. Often, lignins are modified in the isolation and production process. Preferably, the lignin is chemically modified. Preferably, the lignin is sulfonated lignin (lignosulfonate) and/or alkali lignin. In industrial technology, lignin from natural sources is often chemically modified, especially to sulfite, soda or kraft lignin. The most abundant source of lignin is chemical pulping, such as kraft and sulphite pulping. Almost 90% of the pulp production comes from the kraft process. Preferably, the average molecular weight is between 2,000 and 50,000, especially between 5,000 and 3,000. Preferably, the binder comprises lignin and also triethanolamine, the latter for example in an amount of 0.1 to 10 wt. %

In a preferred embodiment, the binder comprises starch. In this embodiment, the starch is a structural component. Preferably, the amount of starch in the binder is at least 5 wt. %, preferably at least 10 wt. % of all solid binder components. Preferably, the maximum amount of starch is up to 80 wt. %, more preferably up to 60 wt. % or up to 40 wt. %. Preferably, the amount of starch is 5 to 80 wt. %, more preferably 10 to 60 wt. % (total solids of binder). Preferably, the amount of starch in the binder is lower than the amount of protein and/or of the polyphenolic compounds.

Preferably, the starch is from natural origin. Preferably, the origin is plants, especially grain or vegetable. For example, the starch origin can be grain, such as corn (maize), wheat, rye, rice, barley, millet, oats or sorghum; tubers, such as potatoes, manioc, maranta or batata; fruits, such as chestnuts or acorns; beans peas or other legumes, bananas; or plant pulp, such as sago palm. Preferably, the starch is corn starch. The starch can be native (natural) or modified. Native starch is directly isolated from a natural source without physical or chemical treatment. Typically, native starch has a granular structure and is water-insoluble.

Preferably, the starch is modified. Modified starch can be obtained by physical and/or chemical treatment of native starch. The treatment can modify physical or chemical properties to render the starch more suitable for subsequent applications. For example, the modification can adjust solubility or the viscosity or reduce retrogradation. For industrial applications, native starch is usually treated to increase water solubility. According to embodiments of the invention, it was found that modified starch can confer high dimensional stability at hot temperature to the nonwoven carriers.

In a preferred embodiment, the starch is chemically modified. The term "chemically modified" includes all changes of the chemical structure of native starch, including hydrolysis of the polysaccharide main chain and modification of functional groups, especially the hydroxyl groups. Native starch is often subjected to controlled degradation through thermal, acid and/or enzymatic treatment, or chemically modified by introducing specific functional groups. The chemical reaction can be enzymatic. The chemically modified starch can be dextrin, maltodextrin, alkaline-modified starch, bleached starch, oxidized starch, cyclodextrin, acetylated starch, hydroxypropylated starch, starch ether, hydroxyethyl starch, cationic starch or carboxymethylated starch.

In a preferred embodiment, the starch is partly hydrolysed. Partly hydrolysed starch is characterized by lower polysaccharide chain length compared to its native starch precursor. Partial hydrolysis can improve solubility and viscosity, such that the binder can be produced, handled and applied more conveniently. It was found that partly hydrolysed starch can confer advantageous properties to the nonwoven carriers.

Preferably, the starch has a viscosity of 50 mPa*s to 800 mPa*s, more preferably 250 mPa*s to 600 mPa*s, as determined according to ISO 2555 at a concentration of 25 wt. % and 23° C. Preferably, the starch viscosity is at least 50 mPa*s, more preferably at least 250 mPa*s. It was found that the mechanical stability of the nonwoven carrier at cold and hot temperature can be improved significantly, if the viscosity of the starch is adjusted accordingly. Without being bound to theory, it was found that viscosity may be a more suitable parameter for selecting the type of starch in the binder composition than molecular weight, because viscosity depends not only from molecular weight, but also other properties such as the three dimensional structure of the starch molecules.

In a preferred embodiment, the starch is partly oxidized. Partly oxidized starch is characterized by a defined amount of carboxylic groups. For example, the oxidized starch may comprise 0.1 to 10% or 0.2 to 3% carboxylic side chains, based on the total number of hydroxyl groups. It was found that partly oxidized starch can confer advantageous properties to the binder.

In a preferred embodiment, the starch is waxy. Preferably, the ratio of amylopectin is relatively high, preferably more than 70%, more than 90% or more than 98% (wt %, of total amount amylose and amylopectin). Starch is a polysaccharide, which consist essentially of amylose and/or amylopectin. Starch having a high level of amylopectin has specific properties and is often described as waxy. It was found that waxy starch, especially waxy corn starch, can confer high dimensional stability at hot temperature to the nonwoven carrier.

In another embodiment, the starch side chains are not chemically modified. Native starches, physically modified and partly hydrolysed starches have a characteristic structure, in which all functional groups on the polymer backbone are hydroxyl groups. The dimensional stability of the nonwoven carrier at hot temperature may also be sufficient when the starch hydroxyl groups are not chemically modified.

Preferably, the starch is physically modified. Starch can be subjected to a physical treatment, for example under heat and/or mechanical shearing, which changes the physical structure. Physical modification can render the starch more homogeneous, which can improve the binder properties. In a highly preferred embodiment, the starch is partially oxidized waxy corn starch, which may have an amylopectin ratio of more than 90%.

According to embodiments of the invention, it was surprisingly found that the inventive binder can confer high dimensional stability at hot temperature and good mechanical resistance at cold temperature to the nonwoven fabric. Without being bound to theory, it is assumed that the interaction between the protein and the polyphenolic compound increases dimensional stability upon crosslinking. It has been described in the literature that tannins can form bonds with proteins in various ways (Hagerman, A. E. Chemistry of tannin-protein complexation. In: Hemingway, R. W.; Karchesy, J. J. (eds.) Chemistry and significance of condensed tannins, 1989, Plenum Press, New York, p323). Furthermore, additional starch can significantly improve dimensional stability at hot temperature. For increasing the mechanical strength, it may be advantageous if the composition comprises more protein than starch. For example, it was found that a 3:1 mixture of soy flour:starch provides an efficient binder. Overall, it was unexpected that a binder mixture based on these structural components from natural origin would confer such advantageous properties to the nonwoven even at 180° C. The dimensional stability at hot temperature can even be higher than for a reference binder based on polyacrylate and formaldehyde melamine, which is commercially used in the art.

Preferably, the nonwoven is consolidated such that the binder is covalently crosslinked. Typically, during or after binder consolidation the nonwoven carrier is subjected to conditions at which crosslinking occurs; such as high temperature, high or low pH, pressure, water depletion and/or radiation. Most preferably, crosslinking is induced by high temperature.

Preferably, the binder does not comprise an additional crosslinker. It was found that the binder confers high stability to the nonwoven without additional crosslinkers. This is advantageous, because the binder composition is relatively simple and may not comprise formaldehyde or formaldehyde resin. Preferably, it does not comprise urea-formaldehyde, melamine-formaldehyde or acetone-formaldehyde, glyoxal or glyoxal resins, urea or urea resins. Preferably, the binder does not comprise a crosslinking agent of natural origin. Preferably, it does not comprise non-polymeric polycarboxylic acids or anhydrides thereof, such as low molecular weight carboxylic acids having two, three or more carboxylic groups, such as citric acid or succinic acid. Preferably, the binder does not comprise a catalyst, especially not a catalyst for promoting crosslinking. Preferably, the binder does not comprise an additional nitrogen-containing compound, such as a diamine and/or a compound with a primary amine group. Preferably, the binder does not comprise an additional carbonyl compound, specifically not one as defined in claim 1 of FR3032195A1. In a less preferred embodiment, the binder comprises an additional crosslinker.

In a preferred embodiment, the binder comprises at least one additive. Preferably, the total amount of additives is less than 20 wt. %, preferably less than 10 wt. %, more preferably less than 5 wt. %, of all solids in the binder composition. In a preferred embodiment, the binder comprises at least one additive. Accordingly, the total amount of the protein, polyphenolic compound and starch is preferably at least is less than 80 wt. %, preferably at least 90 wt. %, more preferably at least 95 wt. %, of all solids in the binder composition. The additive is added to the binder composition purposefully. It is preferably not an impurity of another component. Additives are not protein, starch or polyphenolic compound from natural origin. Additives are also not components of the natural raw material in which the protein, starch or polyphenolic compound is provided, such as soy flour.

Preferably, the additive is a functional additive, which confers a desired property to the binder or aqueous binder composition. Preferably, the additive is a catalyst, adhesion promoter, anti-foaming agent, wetting agent, coupling agent, hydrophobing agent, UV stabilizer, filler, colorant, flame retardant, pH adjusting agent or processing aid. In a specific embodiment, the additive is not a polymer. Preferably, the additive is not a structural binder polymer. In a preferred embodiment, the binder does not comprise a filler. The total amount is the amount which is included purposefully, i.e. to modify the properties. Thus, the total amount of additives does not comprise impurities of other components, such as soy flour components which are not soy protein.

Typically, the aqueous binder composition comprises impurities. This is normal when using natural products such as proteins, starch, tannins or lignins, which are often provided in the art at low purity for industrial applications. According to embodiments of the invention, it was found that such impurities at least do not seem to impair the binder system. For example, the aqueous binder composition may comprise up to 30%, up to 40% or even up to 50% impurities, when protein is provided in the form of flour and/or when tannin extracts for industrial use are included.

In a preferred embodiment, the binder comprises at least one catalyst. Preferably, the catalyst is a Lewis acid, especially a weak Lewis acid. Lewis acids can induce the condensation of tannins. Preferably, such a catalyst is silica or boric acid, preferably silica especially highly disperse silica. It is preferred that the silica is provided as a silica powder. The addition of finely powdered silica to tannin solutions at basic pH was found to be particularly effective. A particular advantage of silica is that it is also a natural product and non-toxic. The catalysts can be used with basic binder formulations, but also at a neutral or acidic pH. Highly disperse silica is commercially available, for example under the trademarks Aerosil or Aerodisp (Evonik, DE). Preferably, the amount of catalyst, such as silica, in the binder is between 0.1 to 10%, more preferably between 0.2 and 3% (total dry weight of aqueous binder solution).

In a preferred embodiment, the binder comprises at least one anti-foaming agent and/or wetting agent. Preferably, the amount is in the range from 0.1 to 5% for the anti-foaming agents and from 0.1 to 20% for the wetting agent (total dry weight of the binder formulation). Preferred anti-foaming agents are hydrophobic silica, alkoxylated compounds and vegetable oils in emulsion form or emulsions of polysiloxane copolymers with hydrophobic silica. For example, suitable anti-foaming agents are commercially available under the trademark Antifoaming agent or Agitan 155 (Münzing Chemie, DE). Typical wetting agents are tensides, such as non-ionic or ionic surfactants, also as blends with organic-modified polysiloxanes. For example, suitable wetting agents are commercially available under the trademark Metolat 348 or Metolat 362 (Müzing Chemie, DE).

In a preferred embodiment, the binder comprises at least one coupling agent and/or adhesion promoter. This can be advantageous if the nonwoven substrate contains a glass fiber reinforcement. Thereby, an organic polymer can be bonded to an inorganic fiber in order to improve the mechanical strength of the nonwoven. Preferably, the adhesion promoter is a silane, preferably an organosilane or organofunctional silane. Silanes comprise a central silicon atom attached to organic or inorganic reactive or non-reactive groups. An organosilane contains at least one carbon-silicon bond. Silanes can react with hydroxyl groups of inorganic substrates such as glass, often when moisture is present, to form a strong chemical bond that provides protection and durability. Further, the silane can react with hydroxyl groups of binder components, such as the starch, protein and polyphenolic compound. Organofunctional silanes are even more suitable in the present invention. They possess further reactive groups on the carbon-based substituents of a silicon atom, which can be used as reactive sites for providing interfaces, which improve performance and durability of the bound substrate. PET does not contain regular binding sites for covalent bond formation. However, adhesion of the binder to PET can be promoted by introducing high energy groups and hydrogen bond potential in the interphase area or by taking advantage of end-group reactions. Aminoalkylsilanes, chloroalkylsilanes and isocyanatosilanes are the most common reagents for coupling to polyesters. An example for a suitable organofunctional silane is N-(2-aminoethyl)-3-aminopropyltrimethoxysilane (or N-[3-(trimethoxysilyl)propyl]-ethylenediamine), which is available under the trivial names DAMO and DAMO-T. Preferably, the amount of coupling agent and/or adhesion promoter in the binder is between 0.1 to 10%, more preferably between 0.2 and 5% (total dry weight of binder).

In a preferred embodiment, the binder comprises at least one hydrophobing agent. When relatively high amounts of starch are used, it is preferred to include a hydrophobing agent, which neutralizes the affinity of starch with water. The hydrophobing agent can limit the capillarity absorption of the nonwoven fabric, which can be caused by the presence of hydroxyl groups in the starch molecule. The water absorption is unfavourable for the applications of nonwoven fabrics in waterproofing in general or for roofing. A water repellent compound is generally used as a hydrophobing agent such as to inhibit the action of capillarity absorption in the nonwoven fabric fibers. Preferably, the hydrophobing agent is alkyl ketene dimer (AKD), a fatty acid derivative with two hydrocarbon groups (R1 and R2) containing 8-36 carbon atoms, which may be saturated, unsaturated, branched or linear. The hydrocarbon groups used normally include molecules with 14-18 carbon atoms. When these hydrocarbon groups react with carbohydrates, they impart hydrophobic properties. The hydrophobing compound may be applied to the nonwoven fabric by means of different techniques, including spray atomization on the end product, or added to the formulation and applied by impregnation. Generally, the optimal amount of the hydrophobing compound to be added in the impregnation step must be from 0.5 to 4% as compared to the starch weight on a dry basis, preferably of more than 1%.

Preferably, water is the only solvent in the aqueous binder. It is advantageous for cost and environmental reasons that organic solvents are not required. In a preferred embodiment, the binder comprises at least one pH adjusting agent. The solubility of proteins in aqueous solution depends on the distribution of hydrophilic and hydrophobic amino acid residues on the protein's surface and the pKa value, and from external factors such as pH, excipients and temperature. The solubility of a protein is usually at a minimum at its isoelectric point, which is the pH at which it has a net charge of zero. Any change in the pH in a protein's environment affects the solubility of the protein. These changes reflect changes in the three-dimensional structure of the protein. Soy protein has an isoelectric point of about 4.6. It is increasingly denatured the further the pH is above or below the isoelectric point. Under more acidic conditions, the protein is more positively charged, and under more basic conditions, the charge is negative. In both cases, solubility is increased compared to the solubility at the isoelectric point. For example, while solubility at pH 4.6 is almost zero, it is almost 70% at pH 1, about 55% at pH 7 and above 90% at pH 11. Therefore, the addition of pH adjusting agents can be beneficial in the present invention in order to increase protein solubility. For increasing of the pH above pH 7, bases such as alkali metal hydroxides (e.g. sodium hydroxide, potassium hydroxide), earth alkali metal hydroxides (e.g. calcium hydroxide) or ammonium hydroxide can be added. A preferred based pH range for the binder is between 6 to 14. For lowering the pH below 7, acid can be added to the solution. Such acids can be mineral acids (e.g. hydrogen chloride, sulfuric acid, sulphurous acid, etc.) or organic acids, such as carboxylic acids, such as formic, acetic, lactic, citric, oxalic, uric or malic acid. However, due to possible corrosion below pH 7, embodiments at neutral or alkaline pH are preferable. The amount of the pH adjusting agents depends on the desired pH and the quantity. Typically, between 0.1 and 10% by weight can be added to the binder.

In a preferred embodiment, the pH of the aqueous binder composition is between 5 and 10, especially between 6 and 9. Surprisingly, it was found that the binder can be applied effectively at and around neutral pH. This is advantageous, because a strongly basic or acidic pH in the binder bath, which would be undesirable for workability and worker safety, is not required.

In a preferred embodiment, the binder comprises 5 to 80 wt. %, preferably 10 to 60 wt. %, protein,
5 to 80 wt. %, preferably 10 to 60 wt. %, polyphenolic compound from natural origin, and
0 to 80 wt. %, preferably 5 to 50 wt., starch.

All percentages refer to total dry weight of the binder composition and/or consolidated binder, unless provided otherwise. In a preferred embodiment, the binder comprises 40 to 80 wt. % soy flour, 15 to 50 wt. % polyphenolic compound from natural origin, and 0 to 40 wt. %, preferably 5 to 30 wt. % starch, based on the total dry weight. The aqueous binder can be prepared by dissolving the protein and optionally the starch, under heating and adding the polyphenolic compound, preferably after cooling.

In addition, the binder may comprise up to 20 wt. %, preferably up to 10 wt. %, additives based on the total dry weight. As noted above, the binder may comprise impurities which are part of the protein, polyphenol or starch composition, for example in an amount of up to 30 wt. %, up to 40 wt. % or up to 50 wt. % of the binder composition, based on the total dry weight.

In one embodiment, it is preferred that no other structural polymers are purposefully added to the binder composition (except for impurities). In industrial applications, it is advantageous if such a binder consists of a relatively low number of components. Moreover, it can be prepared relatively easily from components of natural origin. The simple binder composition can improve product uniformity, reproducibility and quality control.

In a preferred embodiment, the binder does not comprise additional structural polymers which are different from starch, protein and the polyphenolic compound. Preferably, the inventive binder is mostly or fully biodegradable. Preferably, it consists of components from natural origin and/or is fully biodegradable. Preferably, the binder does not comprise synthetic polymers, such as a polyacrylate, polymethacrylate, SBR, polyurethane, polyamide, polyester or polyvinyl alcohol. This is highly advantageous, because synthetic polymers are not available from natural sources and are typically not biodegradable. Thus, the binder used in the present invention reduces waste problems, improves the carbon dioxide balance and is sustainable.

The nonwoven carrier comprises a nonwoven, which is the substrate for binder impregnation. In certain embodiments, the nonwoven fibers are organic polymer fibers.

Organic polymer fibers can be synthetic fibers or natural fibers. Preferably, the fibers are synthetic polymer fibers. Synthetic fibers are produced from organic polymers by an industrial polymerization process. It was found that the binder is especially suitable for bonding synthetic fibers. Thus, the nonwoven as such is preferably not assembled from other fibers, which are not synthetic. It is preferred that the nonwoven does not comprise inorganic nonwoven fibers.

In certain embodiments, the nonwoven consists of the organic polymer fibers, especially synthetic polymer fibers. This means that the organic polymer fibers are the only nonwoven fibers. However, the nonwoven may comprise a reinforcement. Although the reinforcement may consist of fibers, yarns or filaments, it is not a nonwoven and thus not a portion of the random nonwoven fiber assembly. The reinforcing fibers are not nonwoven fibers. Preferably, the reinforcement consists of inorganic fibers, preferably glass fibers. Preferably, the reinforcement is oriented. Preferably, the reinforcement is yarns or filaments, which can be aligned in parallel. Typically, the reinforcement is incorporated into the nonwoven during or after nonwoven formation. In a highly preferred embodiment, the reinforcement consists of glass yarns, which are preferably aligned in parallel, especially in machine direction.

The nonwoven can be a spunbond, spunlaid, spunlace, melt-spun or staple fiber nonwoven. Preferably, the nonwoven is spunbond. As used herein, the term fiber encompasses continuous fibers (filaments) and staple fibers. Staple fibers are characterized by defined length, whereas continuous filaments ("endless" filaments) can be obtained in a continuous spinning process. In one embodiment, the fibers are continuous filaments. In another embodiment, the nonwoven consists of staple fibers. Staple fibers can be processed and laid by conventional means, such as carding. Preferably, the length of staple fibers is between 20 mm to 200 mm, more preferably between 60 mm to 100 mm.

Preferably, the nonwoven comprises or consists of fibers from synthetic polymers. Thus, the fibers and nonwovens are "plastics". For example, the polymers can be polyester or polyamide. It was surprisingly found that the binder based on protein and polyphenolic compound from natural origin can confer high stability and advantageous mechanical properties to synthetic fiber nonwovens at cold, but even at hot temperature. This was unexpected, because synthetic polymers are relatively hydrophobic. Thus, they have a relatively low affinity to aqueous binders and soluble, mostly hydrophilic aqueous binder components. The surface free energy (SFE) indicates if a material is wettable, and thus interacts well with aqueous solutions and hydrophilic components. In a preferred embodiment, the surface free energy (SFE) of the polymer is less than 50 mN/m, preferably less than 45 mN/m, which indicates that the wettability with water is relatively poor. The SFE of PET is 42 and of polyamide-6 is 38. In contrast, the SFE of polar materials is generally above 50 mN/m. For example, the SFE of polar and wettable glass is about 90. The SFE can be determined by measuring the contact angel in a sessile drop method with the optical tensiometer (OWRK method).

It is preferred that the synthetic polymer has a melting point above 200° C., more preferably above 220° C. This is advantageous for mechanical stability of the nonwoven in the bitumen impregnation process at hot temperature. The nonwoven may comprise monocomponent and/or multicomponent fibers, such as bicomponent fibers.

Preferably, the synthetic polymer is a polyester. The polyester can be polyethylene terephthalate, polybutylene terephthalate or a polyester copolymer. It is highly preferred that the polyester is polyethylene terephthalate (PET). PET nonwovens are suitable as carriers for bituminous membranes, because they combine high mechanical strength at room temperature with dimensional stability at hot temperature. According to embodiments of the invention, it was found that the binder has strong adhesion to PET fibers. In a preferred embodiment, the nonwoven consists of PET fibers and optionally a reinforcement from inorganic fibers, especially glass fibers. Preferably, the PET is recycled PET, for example from used PET bottles. Thereby, a sustainable nonwoven carrier can be provided.

The nonwoven may comprise a mixture of PET fibers and other synthetic fibers, for example less than 50%, less than 20% or less than 10% by weight of other fibers. For example, the other fibers could be relatively stable at hot temperature, such as polyamide fibers and/or natural fibers.

In another embodiment, the nonwoven fibers are natural fibers. These consist of biopolymers as the fiber forming material. The biopolymers could be cotton, linen, sisal, jute, hemp or coconut fibers. The natural fibers can be modified, for example by chemical modification of polymer side chains. Natural fibers can be advantageous, because a nonwoven carrier which is fully based on materials from natural origin could be prepared with the binder.

In certain embodiments, the nonwoven does not comprise inorganic nonwoven fibers, such as glass fibers. Nonwoven fibers are part of the fiber mixture from which the nonwoven fabric is produced.

Preferably, the linear density of the nonwoven fibers is 0.5 to 20 dtex, more preferably 1 to 10 dtex, especially in the range of 2 to 6 dtex. Nonwovens made from such fibers can provide strength and flexibility to bituminous membranes. Preferably, the diameter of the nonwoven fibers is in the range of 5 μm to 50 μm, preferably 10 to 30 μm.

In a preferred embodiment, the nonwoven comprises a reinforcement. As used herein, the reinforcement is fiber structure, i.e. fibers, filaments, yarns, wires or other elongated structures. The reinforcement is not nonwoven fibers or a nonwoven. Reinforcing fibers are different from the nonwoven fibers, because they are not randomly laid into the fleece (the nonwoven precursor) in the nonwoven production process, as the nonwoven fibers. In contrast, the reinforcement is incorporated by different means in or after the nonwoven production process. Often, a reinforcement is directed, i.e. it confers strength to the nonwoven in a specific direction. For example, the reinforcement can be linear yarns or a discrete layer, such as a scrim. The reinforcing fibers are not part of the fiber raw material, which is laid to form the nonwoven or fleece precursor. Preferably, the reinforcement is embedded in interior of the nonwoven carrier. The reinforcement can be multi- and/or monofilaments. The reinforcement can be from aramids, preferably so-called high-module aramids, carbon, glass, glass rovings, mineral fibers (basalt), high-strength polyester monofilaments or multifilaments, high-strength polyamide monofilaments or multifilaments, as well as yarns, such as hybrid multifilament yarns (yarns containing reinforcing filaments and lower melting binder fibers), or wires (monofilaments) made of metals or metallic alloys. Preferably, the reinforcement is made from inorganic fiber, such as glass fibers or glass fiber yarns.

In a preferred embodiment, the nonwoven is reinforced with glass fibers or yarns. Preferably, the reinforcement is glass fiber yarns. Preferably, the amount of glass fiber yarns in the nonwoven carrier is 2 to 20 wt. %, preferably 5 to 15 wt. %. Such levels are normally sufficient for increasing the mechanical strength without impairing the nonwoven properties. Preferably, the yarns are aligned to each other, preferably in parallel.

In one embodiment, the nonwoven carrier is a composite substrate which comprises an additional, separate layer. The additional layer can be a nonwoven, fiber mat, woven, net or scrim, or a layer of fibers and/or yarns. In another embodiment, the nonwoven does not comprise an additional layer.

In a preferred embodiment, the base weight of the nonwoven without binder is from 50 to 500 g/m$^2$, more preferably from 100 to 300 g/m$^2$, especially from 150 to 250 g/m$^2$. Such base weights are especially suitable for bituminous membranes. The nonwoven can be pre-consolidated before impregnation with the binder. The pre-consolidation can be mechanically or thermal bonding. Preferred is a mechanical pre-consolidation, for example by needling or hydroentanglement. Preferably, the load of binder (add-on) is from 1% to 50 wt. %, preferably from 5% to 30 wt. %, of the nonwoven weight without binder. In a preferred embodiment, the load of the binder is from 5% to 25 wt. %. It was found that the bonding with the binder is so strong, that such a relatively low amount of binder is sufficient. This is advantageous, because the use of binder is relatively low and the porosity of the nonwoven carrier is high.

Preferably, the thickness of the nonwoven carrier is between 0.25 mm and 6 mm, more preferably between 0.5 mm and 4 mm, and especially between 0.8 mm and 2 mm, as determined according to ISO 9073-2, 1997, section 5.1, for normal nonwovens.

Preferably, the sum of tensile strength in cross and machine direction of the nonwoven carrier at room temperature (23° C.) is at least 800, preferably at least 900 N/5 cm, determined according to ISO 9073-3. Preferably, the sum of tensile tenacity in cross and in machine direction of the nonwoven carrier at room temperature (23° C.) is at least 3.8, preferably at least 4.0, more preferably at least 4.2 N/gm$^2$/5 cm, determined according to ISO 9073-3. Preferably, the air permeability of the nonwoven carrier is 250 ÷2500 I/m$^2$, as determined by EN ISO 9037-15.

In one embodiment, the properties outlined above can be determined for a standard spunbond polyester nonwoven with glass reinforcement and a base weight of about 180 g/m$^2$ with additional 14 wt. % binder add-on.

Another embodiment of the invention is a method for producing the nonwoven carrier of the invention, comprising the steps of
 (a) providing a nonwoven substrate,
 (b) impregnating the nonwoven substrate with an aqueous binder as described above, and
 (c) consolidating the binder to obtain the nonwoven carrier.

The consolidation is preferably by crosslinking, preferably under heating. In or after step (c), water is removed from the binder and the nonwoven is dried.

Another embodiment of the invention is the use of the nonwoven carrier of the invention as a substrate for a bituminous membrane. A further embodiment of the invention is a bituminous membrane, comprising the nonwoven carrier of the invention. Yet another embodiment of the invention is a method for producing a bituminous membrane, comprising the steps of
 (A) providing a nonwoven carrier of the invention, and
 (B) impregnating the nonwoven carrier with bitumen.

Typically, the nonwoven carrier is impregnated with bitumen in a molten bitumen bath. The nonwoven carrier is immersed in the bath and removed with the bitumen attached to it, followed by drying and solidification. The bituminous membrane is normally watertight and non-porous. In the bituminous membrane, the nonwoven carrier typically amounts to 3 to 40%, preferably 5 to 20% of the total weight. Preferably, the method is an automated, continuous process, in which "endless" rolls of the nonwoven carrier are fed into the production line and "endless" rolls of the bituminous membrane are produced as the final product. The flexible bituminous membrane in roll form can be stored, shipped and provided to the building site, where it can be unrolled and applied by the user. The bituminous membrane can be used in building and roofing applications. Typically, it is unrolled and cut to desired size and shape. The bituminous membrane is softened by flaming, such that it can be deformed and aligned to the surface of a construction site. Additional layers such as insulating layers or tiles can be laid over bituminous membrane. Standardized methods for applying bituminous membranes in building applications are described in DIN V 20000-201.

Another embodiment of the invention is a roof, building material or building, which comprises a bituminous membrane of the invention. Preferably, the bituminous membrane is used as a roofing membrane, sarking membrane, sealing membrane or waterproofing sheet.

A further embodiment of the invention is an aqueous binder composition comprising, based on the total solids of the aqueous binder, 5 to 80 wt. % protein, and 5 to 80 wt. % polyphenolic compound from natural origin, and 5 to 50 wt. % starch. Another embodiment of the invention is the use of the aqueous binder composition for consolidating a nonwoven substrate.

Another embodiment of the invention is the use of an aqueous binder for consolidating a nonwoven substrate and/or for improving the mechanical resistance of the nonwoven substrate and/or improving the dimensional stability of the nonwoven substrate at a temperature of at least 180° C., wherein the nonwoven fibers are organic polymer fibers, wherein the binder comprises protein and a polyphenolic compound from natural origin.

Preferably, the use of the binder is for improving the mechanical resistance at room temperature (23° C.) and/or the dimensional stability at hot temperature between 160° C. and 220° C., preferably between 180° C. and 200° C. The binders and nonwovens in these embodiments are preferably provided and applied as described above.

A nonwoven carrier for producing bituminous membranes is provided which is easily available, easy to produce, inexpensive and has excellent mechanical properties. The nonwoven carrier can be flexible and thus be bent and rolled. At the same time, it can combine high mechanical resistance at room temperature with high dimensional stability at hot temperature. This renders the nonwoven carrier highly suitable for industrial bituminous membrane production and for building and roofing applications. Even further, the binder consolidated nonwoven has high mechanical resistance at low and at hot temperature. Therefore, the nonwoven is generally suitable for applications, in which mechanical force is applied at high temperature.

Moreover, the binder can be provided entirely from natural ingredients. It was unexpected that a binder system based on natural raw materials could confer such advantageous mechanical properties to nonwovens, that they become suitable as carriers for producing bituminous membranes. It is also advantageous that all basic binder components are abundant in nature and available at low costs for industrial scale production. Thus, a significant cost reduction can be achieved compared to conventional binders in the art.

Overall, it was unexpected that a system based on the natural compounds protein, polyphenols and optionally starch would provide such advantageous properties and is variable at the same time. Because of multiple interactions between components, especially ternary systems in the art tend to be adversely affected by modifications.

EXAMPLES

Materials and Methods
Binder Polymers

| Tradename | Classification | Properties |
|---|---|---|
| SF 200/20 (protein) | Defatted Soy Flour, CAS No. 68308-36-1 Typical composition (may vary): | Medium particle size: 0.074 mm (200 Mesh), PDI: 20 |
| SF 200/70 (protein) | Proteins (50%) (mainly globulins), Carbohydrates (32%) | Medium particle size: 0.074 mm (200 Mesh), PDI: 70 |
| SF 200/90 (protein) | (polysaccharides, oligosaccharides, sucrose, cellulose, hemicellulose, pectin, others), Water (8%), Ash (7%), Fat (3%) | Medium particle size: 0.074 mm (200 Mesh), PDI: 90 |
| Gelatine | Aqueous solution 55 wt. % gelatine | |
| Tannin A | Condensed tannin, sulfated extract obtained mainly from quebracho Schinopsis lorentzii | Tannin content: ≥74.5% Insoluble content: no information Water content: ≤7% Non-tanning content: no information Ash: ≤8%, pH: 4.5-5.0 (at 6.9° Bé) |
| Tannin B | Hydrolyzable tannin, natural extract obtained mainly from Castanea sativa | Tannin content: ≥75% Insoluble content: no information Water content: ≤8% Non-tanning content: no information Ash: ≤4%, pH: 3.2-3.8 (at 1%) |
| Tannin C | Condensed tannin, natural extract obtained mainly from Acacia mearnsii (Mimosa) | Tannin content: ≥65% Insoluble content: no information Water content: ≤8% Non-tanning content: no information Ash: ≤4%, pH: 3-5 (at 10%) |

-continued

| Tradename | Classification | Properties |
|---|---|---|
| Tannin D | Pyrokatechin tanning material (Phlobaphen former) Acacia negra, Acacia molissima | Tannin content: ≥72.5%<br>Insoluble content: ≤1%<br>Water content: ≤7%<br>Non-tanning content: ≤26.5%<br>Ash: no information<br>pH: 4.3-4.7 (at 6.9° Bé) |
| Tannin E | Condensed tannin, natural extract Acacia mearnsii | Tannin content: 68.3-72.3%<br>Insoluble content: 0.2%<br>Water content: 6.5%<br>Non-tanning content: 21-25%<br>Ash: 1.2%, pH: 4.7 |
| Tannin F | Pyrokatechin tanning material (Phlobaphen former) Quebrachia lorentzii syn./Schinopsis balansae | Tannin content: 76% +/− 1.5%<br>Insoluble content: 0.3% +/− 0.1%<br>Water content: 8.0% +/− 2.0%<br>Non-tanning content: 15% +/− 4.9%<br>Ash: ≤6.5%, pH: 4.4-4.9 (at 6.9° Bé) |
| Tannin G | Condensed tannin, natural extract; Schinopsis balansae, Schinopsis lorentzii | Tannin content: 70.5-73.5%<br>Insoluble content: no information<br>Water content: 8.5-9.5%<br>Non-tanning content: no information<br>Ash: ≤7.2%, pH: 4.7-5.1 |
| Tannin H | Hydrolyzable tannin, 100% gallotannins | Tannin content: ≥90%<br>Insoluble content: no information<br>Water content: ≤7%<br>Non-tanning content: no information<br>Ash: ≤1%, pH: 2.6-3.0 (at 1%) |
| Tannin J | Hydrolyzable tannin, natural extract obtained mainly from Caesalpinia spinosa | Tannin content: 54-59%<br>Insoluble content: 6-12%<br>Water content: 7-10%<br>Non-tanning content: no information<br>Ash: unknown, pH: 3-4 |
| Lignin A | CAS Number 8068-05-1 | Lignin, alkali<br>low sulfonate content; average Mw ~10,000; impurities: 4% sulphur<br>pH: 10.5 (3 wt. %) |
| Lignin B | CAS Number 8061-52-7 | Lignosulfonic acid calcium salt<br>average Mw ~18,000, average Mn ~2,500<br>composition Ca: 5 wt. %<br>Impurities:<br>16 wt. % reducing sugars; 5 wt. % others<br>Solubility: H2O: soluble |
| Starch | partly oxidized, waxy maize starch | about <2% of oxidized hydroxyl groups |

Functional Additives

| Additive type | chemical name | Trademark | Supplier |
|---|---|---|---|
| Catalyst | suspensions of fumed silica (Aerosil) | Aerodisp W7512S | Evonik, DE |
| Adhesion promoter | [3-(2,3-Epoxypropoxy)-propyl]-trimethoxysilan | | Merck, DE |
| Anti-foaming agent | Blend of vegetable oils, alkoxylated compounds and hydrophobic silica in emulsion form | Agitan 109 | Münzing Chemie, DE |
| Wetting agent | blend of organic-modified polysiloxanes with non-ionic surfactants | Metolat 348 | Münzing Chemie, DE |

Devices

| Type | Model, manufacturer | Settings |
|---|---|---|
| Foulard | HVF 500 (Werner Mathis AG, CH) | 3.5 bar; 2.5 m/min |
| Mathis Oven | Labdryer LTE (Werner Mathis AG, CH) | 200° C.; 225 s |
| Tensile Test Machine | Z020 with temperature chamber load ≤ 20 kN (Zwick Roell, DE) | T = 23° C Pre conditioning = 16 h Humidity (rel.) = 50% T = 180° C Pre conditioning = 30 min Measuring for both: Preliminary load = 2 N Speed = 100 mm/min Sample Width = 50 mm |

Binder Preparation

The aqueous binder compositions were prepared as follows:

(1) Weighing of the required amount of water in a 2 l glass beaker/up to 800 g of a formulation were made in order to have a sufficient quantity for the impregnation of up to 8 A3-pieces of nonwoven. The amount of water was determined to adjust the formulation according to the desired solid content.
(2) Weighing of soy flour and starch.
(3) Stirring of the water at 400 rpm using a 60 mm dissolver disc.
(4) Heating the water to 80° C. using a heating plate.
(5) Addition of the anti-foaming agent and/or wetting agent.
(6) Addition of base NaOH, if a basic pH is used.
(7) Slow addition of soy flour and starch to the water (sometimes through a sieve)
(8) Stirring of the mixture for 1 h.
(9) Slow addition of tannin and stirring for another 5 minutes.
(10) Cooling of the mixture to room temperature while stirring.
(11) Addition of silane and/or catalyst under stirring—only when used.
(12) The formulation is now ready for the impregnation.

In formulations that contain soy flours, the pH was adjusted to approx. 11 to denature and solubilize the protein. Formulations without soy flour were prepared at pH 7. All formulations were adjusted so that the water content was 90% and the solid content 10%. Of all formulations, typically between 200-500 ml were prepared.

Nonwoven Impregnation

The substrate for binder impregnation was a spunbond nonwoven from recycled PET fibers. The nonwoven was reinforced with parallel glass yarns (4.4 dtex, 68 tex, in machine direction). The same substrate is in the commercial product Terbond R180™ (Freudenberg Politex, IT; Freudenberg Performance Materials). The test sheets had A3 format. Binder impregnation was carried out as follows:

(1) Pouring 300 ml binder in Foulard machine
(2) Impregnation of nonwoven
(3) Immediate drying/curing in the oven/before each impregnation; the filling level of binder in the Foulard was adjusted to the maximum level.

Testing of Nonwoven Carriers (1) Conditioning of samples
(2) Cutting of test stripes:
  5× for testing in longitudinal direction (MD), cold conditions
  5× for testing in cross direction (CD), cold conditions
  5× for testing in longitudinal direction (MD), hot conditions
(3) Measuring of samples:
  Cold: measuring at 23° C.: 5× in MD and 5× in CD
  Hot: measuring at 180° C.: 5× in MD Test Methods Applied Tenacity at cold temperature, which is independent from the sample base weight, is a relevant indicator for mechanical resistance of bituminous membranes during use at a building or roofing site. The tensile strength at cold temperature provides also provides relevant information about mechanical resistance and stability during use. Hot tensile strength and hot tenacity provide additional information about mechanical resistance of the binder consolidated nonwoven under stress at elevated temperature. Tensile strength in [N/5 cm] of nonwoven carriers was determined according to ISO 9073-3. Area weight [g/m$^2$] was determined according to IS09073-1. Tenacity [N/g/m$^2$/5 cm] is tensile strength per area weight and was calculated from tensile strength.

Hot tensile deformation (HTD) is the elongation measured at defined tensile force and is an indicator of hot dimensional stability. It is the most relevant parameter for determining if the nonwoven is a suitable carrier for an industrial automated bitumen impregnation process. A low HTD is required such that the carrier can maintain its shape and integrity under mechanical force during the bitumen integration process at about 180° C. The tensile stress test at 180° C. was performed based on US2008/0214716 under modified conditions by tensile stress experiments with a tensile machine (dynamometer) with integrated thermostated chamber at T=180° C. The 5 specimens were 50 mm×180 mm, clamping length was 80 mm and the take-off speed 100 mm/min. The elongation was determined in machine direction (MD) with increasing tensile force at loads of 50 N, 80 N, 100 N and 120 N, whereby the maximum tensile strength was also determined.

Results

In the following tables, amounts of components are provided in solid weight in gram, except catalyst suspension which is provided in gram of 12.1 wt. % suspension.

Reference Binder (Comparative)

Conventional binders for consolidating nonwoven carrier for bituminous membranes are often based on polyacrylate, starch and melamine formaldehyde. This binder is known to confer the mechanical resistance and dimensional stability at hot temperature to nonwoven carriers which are generally required for bituminous membrane production and use. Table 1 shows the composition of a reference binder and properties of the nonwoven carrier consolidated therewith as described above. Notably, the binder load on the nonwoven is 20 wt. % and thus relatively high. The results show that the reference binder can confer good mechanical properties to the nonwoven fabric at cold and hot temperature, which render the nonwoven carrier suitable carrier for producing bituminous membranes. It would be interesting to provide a binder based on natural raw materials, and thus without synthetic polymers and formaldehyde resin, which is also suitable for producing bituminous membranes.

TABLE 1

Composition of reference binder (500 g) and properties of nonwoven carrier

| | |
|---|---|
| Water [g] | 450 |
| Starch HS [g] | 15 |

TABLE 1-continued

| Composition of reference binder (500 g) and properties of nonwoven carrier | |
|---|---|
| Styrene acrylic [g] | 31.5 |
| Melamine formaldehyde [g] | 3.5 |
| Binder solution solid content [%] | 10 |
| Set application [% weight of raw non-woven] | 20 |
| MECHANICAL PROPERTIES 23° C. | |
| Max. longitudinal tensile strength [N/5 cm] | 722 |
| Max. cross tensile strength [N/5 cm] | 454 |
| Longitudinal tenacity [N/gsqm/5 cm] | 3.09 |
| Cross tenacity [N/gsqm/5 cm] | 1.91 |
| MECHANICAL PROPERTIES 180° C. | |
| Max. longitudinal tensile strength hot [N/5 cm] | 227 |
| Max. cross tensile strength hot [N/5 cm] | 130 |
| Max total tensile strength [N/5 cm] | 357 |
| Longitudinal tensile tenacity hot [N/gsqm/5 cm] | 1.06 |
| Cross tensile tenacity hot [N/gsqm/5 cm] | 0.59 |
| Total tenacity [N/gsqm/5 cm] | 1.65 |
| HTD at 10N MD [%] | 0.2 |
| HTD at 30N MD [%] | 0.7 |
| HTD at 50N MD [%] | 0.9 |
| HTD at 80N MD [%] | 1.3 |
| HTD at 100N MD [%] | 1.43 |

HTD: Hot tensile deformation
MD: Machine direction
CD: Cross direction

Examples 1 to 12 (Comparative): Binders Based on Protein and Starch

Various binder compositions were prepared from protein and starch. Nonwoven substrates were impregnated with binders and consolidated. After curing, the tensile strength in machine direction (MD) as well as in counter direction (CD) were measured and compared to the standard binder. The binder compositions and properties of the nonwoven carrier are summarized in table 2. The amounts of starch, soy flours and gelatine refer to percentage by weight with regards to the solid content of the binders. The results show that the nonwoven carrier with a binder based on soy protein has higher tensile strength at room temperature than with gelatine. The binder consolidated nonwoven carrier of example 3 has the highest maximum tensile tenacity in machine direction. Therefore, a mixture of soy flour : starch=3:1 was selected for further experiments.

TABLE 2

Binder compositions (amounts in wt. %) and results for comparative examples 1 to 12

| No. | Starch | SF 200/90 | SF 200/70 | SF 200/20 | Gelatine | F-max MD [N] | F-max CD [N] | Σ F-Max |
|---|---|---|---|---|---|---|---|---|
| 1 | 100 | — | — | — | — | 656 | 370 | 1026 |
| 2 | — | 100 | — | — | — | 658 | 358 | 1016 |
| 3 | 25 | 75 | — | — | — | 700 | 357 | 1057 |
| 4 | 75 | 25 | — | — | — | 676 | 358 | 1034 |
| 5 | 50 | 50 | — | — | — | 643 | 367 | 1010 |
| 6 | — | — | — | — | 100 | 453 | 442 | 895 |
| 7 | — | — | 100 | — | — | 596 | 436 | 1032 |
| 8 | — | — | — | 100 | — | 583 | 409 | 992 |
| 9 | 23.75 | 71.25 | — | — | 5 | 541 | 385 | 926 |
| 10 | 22.5 | 67.5 | — | — | 10 | 629 | 355 | 984 |
| 11 | 20 | 60 | — | — | 20 | 487 | 370 | 857 |
| 12 | standard (acrylate/starch/melamine formaldehyde) | | | | | 722 | 454 | 1176 |

Examples 13 to 16 (Comparative): Binders Based on Tannin and Starch

Various binder compositions were prepared from tannin and starch. Nonwoven substrates were impregnated with binders and consolidated. All amounts represent gram of used substance. The binder compositions and properties of the nonwoven carrier are summarized in table 3. The results show that the mechanical properties are not as good as for formulations that contain protein.

TABLE 3

Binder compositions (amounts of solids in g, based on solid weight) and results for comparative examples 13 to 16

| Example | 13 | 14 | 15 | 16 |
|---|---|---|---|---|
| Water | 240 | 240 | 240 | 240 |
| Starch | 20 | 20 | 20 | 20 |
| SF 200/90 | — | — | — | — |
| SF 200/70 | — | — | — | — |
| Tannin C | — | 6.6 | — | — |
| Tannin D | — | — | 6.6 | 6.6 |
| Tannin H | 6.6 | — | — | — |
| pH | 7 | 7 | 7 | 7 |
| Adhesion promoter | — | — | — | 2 |
| Catalyst | — | — | 1.7 | 3.4 |
| Binder solution solid content [wt. %] | 10 | 10 | 10 | 10 |
| % of dry binder relative to weight of raw non-woven | 12 | 11 | 12 | 14 |
| MECHANICAL PROPERTIES 23° C. | | | | |
| Max. longitudinal tensile strength [N/5 cm] | 498 | 442 | 417 | 412 |
| Max. cross tensile strength [N/5 cm] | 364 | 331 | 339 | 291 |
| Max total tensile strength [N/5 cm] | 862 | 772 | 756 | 703 |
| Longitudinal tenacity [N/gsqm/5 cm] | 2.3 | 2.1 | 2.0 | 1.9 |
| Cross tenacity [N/gsqm/5 cm] | 1.6 | 1.7 | 1.5 | 1.4 |
| Total tenacity [N/gsqm/5 cm] | 3.9 | 3.8 | 3.5 | 3.3 |

Examples 17 to 24 Binders Based on Protein, Starch and Tannin

Various binders were prepared from protein, various tannins and starch. The standard mixture comprised starch and protein at a weight ratio of 1:3. A 10% solution of each tannin was added to the soy flour/starch solution. The solid content of tannin corresponded to 30% of the solid content of soy flour/starch. The nonwoven substrate was impregnated with the binders and the binder was consolidated. The tensile strength of the nonwoven carriers was determined, which is indicative of mechanical resistance. The binder compositions and results are summarized in table 4. The results show that all binders confer high mechanical resistance to the nonwoven carrier. Tannins A, C, E and J gave the best results in terms of total tenacity in CD.

TABLE 4

Binder compositions and results for examples 17 to 24

| Example | 17 | 18 | 19 | 20 | 21 | 22 | 23 | 24 |
|---|---|---|---|---|---|---|---|---|
| Water | 360 | 360 | 360 | 360 | 360 | 360 | 360 | 360 |
| Starch | 7 | 7 | 7 | 7 | 7 | 7 | 7 | 7 |
| SF 200/90 | 21 | 21 | 21 | 21 | 21 | 21 | 21 | 21 |
| NaOH | 0.6 | 0.6 | 0.6 | 0.6 | 0.6 | 0.6 | 0.6 | 0.6 |
| Agitan 109 | 0.03 | 0.03 | 0.03 | 0.03 | 0.03 | 0.03 | 0.03 | 0.03 |
| Tannin A | 10 | — | — | — | — | — | — | — |
| Tannin B | — | 10 | — | — | — | — | — | — |
| Tannin C | — | — | 10 | — | — | — | — | — |
| Tannin D | — | — | — | 10 | — | — | — | — |
| Tannin E | — | — | — | — | 10 | — | — | — |
| Tannin F | — | — | — | — | — | 10 | — | — |
| Tannin G | — | — | — | — | — | — | 10 | — |
| Tannin J | — | — | — | — | — | — | — | 10 |
| Set application (% of dry binder relative to weight of raw non-woven) | 14 | 14 | 14 | 14 | 14 | 14 | 14 | 14 |
| Max. longitudinal tensile strength | 574 | 615 | 584 | 479 | 535 | 559 | 554 | 615 |
| Max. cross tensile strength | 387 | 349 | 482 | 436 | 449 | 413 | 381 | 417 |
| Total tensile strength | 961 | 964 | 1066 | 915 | 984 | 972 | 935 | 1032 |
| Longitudinal tenacity | 2.8 | 2.9 | 2.6 | 2.3 | 2.5 | 2.6 | 2.6 | 2.7 |
| Cross tenacity | 1.8 | 1.5 | 2.1 | 2.1 | 2.1 | 1.9 | 1.9 | 1.9 |
| Total tenacity | 4.6 | 4.4 | 4.7 | 4.4 | 4.6 | 4.5 | 4.5 | 4.6 | tensile strength in N/5 cm/tenacity in [N/gsqm/5 cm]

Example 25 to 29 Binders Comprising Different Amounts of Tannin

A series of experiments was performed with different amounts of tannin. The binder compositions and results are summarized in table 5. The results demonstrate that mechanical resistance at cold temperature and dimensional stability at hot temperature can be improved significantly by adjusting the amounts of components.

TABLE 5

Binder compositions and results for examples 25 to 29

| Example | 25 | 26 | 27 | 28 | 29C |
|---|---|---|---|---|---|
| Water | 490 | 550 | 640 | 730 | 370 |
| Starch | 10 | 10 | 10 | 10 | 10 |
| SF 200/90 | 30 | 30 | 30 | 30 | 30 |
| NaOH | 0.9 | 0.9 | 0.9 | 0.9 | 0.9 |
| Wetting agent | 0.04 | 0.04 | 0.04 | 0.04 | 0.04 |
| Tannin D | 13 | 20 | 30 | 40 | — |
| Catalyst | 3.4 | 5 | 6 | 10 | — |
| Set application (% of dry binder relative to weight of raw non-woven) | 14 | 14 | 14 | 14 | 14 |
| MECHANICAL PROPERTIES 23° C. | | | | | |
| Max. longitudinal tensile strength | 584 | 710 | 597 | 531 | 467 |
| Max. cross tensile strength | 339 | 383 | 352 | 432 | 387 |
| Total tensile strength | 923 | 1093 | 949 | 963 | 854 |
| Longitudinal tenacity | 2.5 | 2.9 | 2.5 | 2.3 | 2.1 |
| Cross tenacity | 1.5 | 1.7 | 1.7 | 1.9 | 1.8 |
| Total tenacity | 4.0 | 4.6 | 4.2 | 4.2 | 3.9 |
| MECHANICAL PROPERTIES 180° C. | | | | | |
| Max. longitudinal tensile strength hot [N/5 cm] | 304 | 329 | 334 | 262 | 299 |
| Max. cross tensile strength hot [N/5 cm] | 225 | 216 | 223 | 241 | 266 |
| Longitudinal tensile tenacity hot | 1.5 | 1.4 | 1.5 | 1.3 | 1.4 |
| Cross tensile tenacity hot | 1.0 | 0.9 | 1.1 | 1.2 | 1.1 |
| HTD at 50N MD [%] | 1.1 | 0.9 | 1.0 | 0.9 | 0.8 |
| HTD at 80N MD [%] | 1.4 | 1.2 | 1.2 | 1.2 | 1.1 |
| HTD at 100N MD [%] | 1.4 | 1.2 | 1.2 | 1.2 | 1.1 |
| HTD at 120N MD [%] | 1.8 | 1.6 | 1.6 | 1.6 | 1.5 | tensile strength in N/5 cm/tenacity in [N/gsqm/5 cm]

Example 30 to 40 Binders Based on Protein Tannin and Starch

Binders comprising different concentrations and types of tannins were prepared and applied to the nonwoven substrate. Binder compositions and properties of the nonwoven carrier are summarized in table 6. The results show that the binders confer high mechanical resistance at room temperature and dimensional stability at hot temperature to the nonwoven carrier. By varying amounts and additives, the binders can be optimized and adjusted to specific requirements.

TABLE 6

Binder compositions and results for examples 30 to 40

| Example | 30 | 31 | 32 | 33 | 34 | 35 | 36 | 37 | 38 | 39 | 40C |
|---|---|---|---|---|---|---|---|---|---|---|---|
| Water | 260 | 260 | 290 | 290 | 320 | 320 | 350 | 350 | 290 | 350 | 230 |
| Starch | 10 | 10 | 10 | 10 | 10 | 10 | 10 | 10 | 10 | 10 | 10 |
| SF 200/70 | 30 | 30 | 30 | 30 | 30 | 30 | 30 | 30 | 30 | 30 | 30 |
| NaOH | 1.0 | 1.0 | 1.0 | 1.0 | 1.0 | 1.0 | 1.0 | 1.0 | 1.0 | 1.0 | 1.0 |
| Wetting agent | 0.03 | 0.03 | 0.03 | 0.03 | 0.03 | 0.03 | 0.03 | 0.03 | 0.03 | 0.03 | 0.03 |
| Tannin D | 5 | — | 10 | — | 15 | — | 20 | — | 5 | 10 | — |
| Tannin C | — | 5 | — | 10 | — | 15 | — | 20 | 5 | 10 | — |
| Set application (% of dry binder relative to weight of raw non-woven) | 20 | 20 | 20 | 20 | 20 | 20 | 20 | 20 | 20 | 20 | 20 |
| MECHANICAL PROPERTIES 23° C. | | | | | | | | | | | |
| Max. longitudinal tensile strength | 590 | 593 | 481 | 494 | 533 | 579 | 526 | 531 | 602 | 529 | 483 |
| Max. cross tensile strength | 359 | 366 | 455 | 444 | 406 | 394 | 374 | 400 | 432 | 356 | 426 |
| Total tensile strength | 949 | 959 | 936 | 938 | 939 | 973 | 900 | 931 | 1034 | 885 | 909 |
| Longitudinal tenacity | 2.6 | 2.5 | 2.2 | 2.2 | 2.4 | 2.4 | 2.3 | 2.4 | 2.5 | 2.2 | 2.2 |
| Cross tenacity | 1.6 | 1.5 | 2.1 | 1.9 | 1.7 | 1.7 | 1.7 | 1.7 | 1.9 | 1.6 | 1.9 |
| Total Tenacity | 4.2 | 4.0 | 4.3 | 4.1 | 4.1 | 4.1 | 4.0 | 4.1 | 4.4 | 3.8 | 4.1 |
| MECHANICAL PROPERTIES 180° C. | | | | | | | | | | | |
| Max. longitudinal tensile strength hot | 360 | 315 | 306 | 350 | 297 | 316 | — | — | 339 | — | 356 |
| Max. cross tensile strength hot | 224 | 214 | 250 | 271 | 220 | 226 | — | — | 274 | — | 243 |
| Longitudinal tensile tenacity hot | 1.5 | 1.3 | 1.3 | 1.5 | 1.4 | 1.4 | — | — | 1.5 | — | 1.6 |
| Cross tensile tenacity hot | 0.9 | 0.9 | 1.1 | 1.2 | 1.0 | 1.0 | — | — | 1.1 | — | 1.0 |
| HTD at 50N MD [%] | 0.9 | 0.9 | 0.8 | 1.1 | 1.2 | 1.1 | — | — | 0.8 | — | 1.4 |
| HTD MD at 80N [%] | 1.3 | 1.3 | 1.1 | 1.7 | 1.6 | 1.5 | — | — | 1.1 | — | 1.8 |

TABLE 6-continued

Binder compositions and results for examples 30 to 40

| Example | 30 | 31 | 32 | 33 | 34 | 35 | 36 | 37 | 38 | 39 | 40C |
|---|---|---|---|---|---|---|---|---|---|---|---|
| HTD at 100N MD [%] | 1.3 | 1.3 | 1.1 | 1.7 | 1.6 | 1.5 | — | — | 1.3 | — | 1.8 |
| HTD at 120N MD [%] | 1.7 | 1.7 | 1.5 | 2.2 | 2.1 | 1.9 | — | — | 1.4 | — | 2.2 | tensile strength in N/5 cm/tenacity in [N/gsqm/5 cm]

Example 41 and 42 Binders at pH 7

Binders were prepared from protein, different tannins and starch at pH 7 (for comparison to pH 11 in the preceding examples). All numbers represent grams of used substance. The binder compositions and properties of the nonwoven carrier are summarized in table 7. The results show that the binders at pH 7 T confer high mechanical resistance at room temperature and dimensional stability at hot temperature to the nonwoven carrier. It is highly advantageous for safety, efficiency and waste management that the binder can be handled at neutral pH, especially in a large scale industrial process.

TABLE 7

Binder compositions and results for examples 41 to 42

| Example | 41 | 42 |
|---|---|---|
| Water | 270 | 270 |
| Starch | 7 | 7 |
| SF 200/90 | 21 | 21 |
| NaOH | 0 | 0 |
| Antifoaming agent | 0.03 | 0.03 |
| Tannin C | 10 | — |
| Tannin D | — | 10 |
| Set application ([% of dry binder relative to weight of raw non-woven] | 10 | 10 |
| MECHANICAL PROPERTIES 23° C. | | |
| Max. longitudinal tensile strength | 492 | 456 |
| Max. cross tensile strength | 345 | 399 |
| Total Tensile strength | 837 | 855 |
| Longitudinal tenacity | 2.5 | 2.4 |
| Cross tenacity | 1.7 | 2.1 |
| Total Tenacity | 4.2 | 4.5 |
| MECHANICAL PROPERTIES 180° C. | | |
| Max. longitudinal tensile strength hot[N/5 cm] | 337 | 303 |
| Max. cross tensile strength hot [N/5 cm] | 245 | 237 |
| Longitudinal tensile tenacity hot | 1.6 | 1.6 |
| Cross tensile tenacity hot | 1.3 | 1.3 |
| HTD at 50N MD [%] | 0.6 | 0.6 |
| HTD at 80N MD [%] | 1.0 | 0.9 |
| HTD at 100N MD [%] | 1.2 | 1.1 |
| HTD at 120N MD [%] | 1.4 | 1.4 | tensile strength in N/5 cm/tenacity in [N/gsqm/5 cm]

Example 43 to 46 Binders Comprising Lignin

Binders were prepared from protein, lignins and starch. The binder compositions and results are summarized in table 8. All numbers represent grams of used substance. The nonwovens have high mechanical resistance at low temperature and high dimensional stability at hot temperature. Therefore, lignins can be used as the polyphenolic compound instead of tannins. A disadvantage when using lignins is that they generally have a significant odor which is particularly noticeable during curing at elevated temperatures. At least for this reason, the use of tannins can be preferred.

TABLE 8

Binder compositions and results for examples 43 to 46

| Example | 43 | 44 | 45 | 46 |
|---|---|---|---|---|
| Water | 318.75 | 318.75 | 318.75 | 318.75 |
| Starch | 11.25 | 11.25 | 11.25 | 11.25 |
| SF 200/90 | 33.75 | 33.75 | — | — |
| SF 200/70 | — | — | 33.75 | 33.75 |
| Triethanolamine | 0.3 | 4 | 0.3 | 4 |
| Wetting agent | 0.45 | 0.45 | 0.45 | 0.45 |
| Lignin A | 11.25 | — | 11.25 | — |
| Lignin B | — | 11.25 | — | 11.25 |
| pH | 7 | 8 | 7 | 8 |
| Binder conc. [%] | 15 | 15 | 15 | 15 |
| % dry binder relative to weight of raw non-woven | 20 | 20 | 20 | 20 |
| MECHANICAL PROPERTIES 23° C. | | | | |
| Max. longitudinal tensile strength | 520 | 460 | 540 | 500 |
| Max. cross tensile strength | 390 | 390 | 400 | 360 |
| Total tensile strength | 910 | 850 | 940 | 860 |
| Longitudinal tensile tenacity | 2.5 | 2.2 | 2.5 | 2.2 |
| Cross tensile tenacity | 1.8 | 1.8 | 1.8 | 1.6 |
| Total tenacity | 4.3 | 4.0 | 4.3 | 3.8 |
| MECHANICAL PROPERTIES 180° C. | | | | |
| Max. longitudinal tensile strength hot[N/5 cm] | 340 | 310 | 360 | 310 |
| Max. cross tensile strength hot [N/5 cm] | 230 | 220 | 260 | 100 |
| Longitudinal tensile tenacity hot | 1.6 | 1.4 | 1.7 | 1.4 |
| Cross tensile tenacity hot | 2.7 | 2.5 | 2.8 | 1.9 |
| HTD at 50N MD [%] | 1.1 | 1.0 | 1.0 | 1.2 |
| HTD at 80N MD [%] | 1.5 | 1.3 | 1.3 | 1.5 |
| HTD at 100N MD [%] | 1.7 | 1.5 | 1.5 | 1.7 |
| HTD at 120N MD [%] | 1.9 | 1.7 | 1.7 | 1.9 | tensile strength in N/5 cm/tenacity in [N/gsqm/5 cm]

Conclusion

The results demonstrate that binders based on protein, polyphenols of natural origin and optionally starch can confer high mechanical resistance at low temperature and high dimensional stability at hot temperature to the nonwoven carrier. At the same time, the nonwoven carriers are flexible, relatively thin and comprise a relatively low amount of binder, such that they remain highly porous. Due to this combination of properties, the binder consolidated nonwoven is highly suitable as a carrier for producing bituminous membranes.

These outstanding properties are achieved with a sustainable binder based on natural materials of up to 100%. No synthetic polymers are required. The catalyst contained in some examples is environmentally uncritical since it is pure silica. The silanes used in some examples are contained only in small quantities. The sustainable binder is advantageous for recycling, waste management and easier production.

The results also demonstrate that the performance of the nonwoven carriers is comparable to the conventional standard binder based on polyacrylate and melamine formaldehyde. Most importantly, hot dimensional stability is similar or can be adjusted even higher than with the standard binder, which is highly advantageous for bituminous membrane manufacturing. The cold mechanical resistance was always high in absolute terms and meets the requirements for standard building and roofing applications. Notably, the advantageous properties were achieved with considerably less binder than for the standard. Thus, binder consumption can be kept low and the nonwoven carrier has more void space for bitumen impregnation. It is also advantageous that the binder can be applied at pH 7. This simplifies the production process, since no acidification, base addition, severe pH control or safety measures for industrial handling of acids are required.

The results also provide evidence that the mechanical resistance at hot temperature is high. Thus, the binder consolidated nonwoven can be used for various other applications, in which high stability is required under mechanical stress at hot temperature.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A porous nonwoven for preparing membranes by impregnation of the nonwoven with bitumen, wherein all nonwoven fibers of the porous nonwoven are organic polymer fibers, wherein the nonwoven is consolidated with an aqueous binder, and wherein the binder comprises protein and a polyphenolic compound from natural origin.

2. The nonwoven of claim 1, wherein the protein is plant protein.

3. The nonwoven of claim 1, wherein the polyphenolic compound is a tannin, or wherein the polyphenolic compound is a lignin.

4. The nonwoven of claim 1, wherein the binder comprises starch.

5. The nonwoven of claim 1, wherein the binder does not comprise a synthetic polymer.

6. The nonwoven of claim 1, wherein the binder comprises, based on the total solids of the aqueous binder,
5 to 80 wt. % protein, and
5 to 80 wt. % polyphenolic compound from natural origin, and
0 to 80 wt. % starch.

7. The nonwoven of claim 1, wherein the organic polymer fibers are synthetic fibers.

8. The nonwoven of claim 1, wherein the nonwoven comprises a reinforcement.

9. The nonwoven of claim 2, wherein the plant protein is soy protein.

10. The nonwoven of claim 3, wherein the tannin is a condensed tannin.

11. The nonwoven of claim 4, wherein the binder comprises starch in an amount of at least 5% wt. % of all solid binder components.

12. The nonwoven of claim 7, wherein the synthetic fibers are polyester fibers.

13. The nonwoven of claim 8, wherein the reinforcement is inorganic fibers or yarns.

14. The nonwoven of claim 1, wherein the void fraction of the nonwoven consolidated with the binder is between 60% and 95%.

15. The nonwoven of claim 1, wherein the base weight of the nonwoven without binder is from 50 to 500 $g/m^2$.

16. A bituminous membrane, comprising a nonwoven carrier of claim 1.

17. A roof, building material or building comprising a bituminous membrane according to claim 16.

18. A method for producing a nonwoven of claim 1, comprising the steps of
(a) providing a nonwoven substrate,
(b) impregnating the nonwoven substrate with the aqueous binder, and
(c) consolidating the binder to obtain the nonwoven carrier.

19. A method for producing a bituminous membrane, comprising the steps of
(A) providing a nonwoven of claim 1 as a nonwoven carrier, and
(B) impregnating the nonwoven carrier with bitumen.

20. A method for consolidating a porous nonwoven substrate and/or for improving the mechanical resistance of the porous nonwoven substrate and/or improving the dimensional stability of the porous nonwoven substrate at a temperature of at least 180° C., comprising impregnating the nonwoven substrate with an aqueous binder, wherein all the nonwoven fibers of the porous nonwoven are organic polymer fibers, and wherein the binder comprises protein and a polyphenolic compound from natural origin.

* * * * *